(12) United States Patent
Cammack (10) Patent No.: US 7,246,669 B2
(45) Date of Patent: Jul. 24, 2007

(54) SOD CUTTING DEVICE

(76) Inventor: Malcolm Cammack, 9052 N. 140th St., Hugo, MN (US) 55038

( * ) Notice: Subject to any disclaimer, the term of this patent is extended or adjusted under 35 U.S.C. 154(b) by 0 days.

(21) Appl. No.: 10/282,938

(22) Filed: Oct. 29, 2002

(65) Prior Publication Data

US 2004/0079536 A1    Apr. 29, 2004

(51) Int. Cl.
*A01B 45/04* (2006.01)
(52) U.S. Cl. .......................... 172/19; 56/12.7
(58) Field of Classification Search ............... 172/19, 172/20; 56/12.7; 30/379, 379.5; 198/308.1; 193/3
See application file for complete search history.

(56) References Cited

U.S. PATENT DOCUMENTS

| 1,052,789 | A | | 2/1913 | Bergstrom | |
|---|---|---|---|---|---|
| 1,106,620 | A | | 8/1914 | Bodine | |
| 1,112,502 | A | | 10/1914 | Walter | |
| 1,438,095 | A | | 12/1922 | Clark | |
| 1,537,412 | A | * | 5/1925 | Daffener | 172/19 |
| 1,610,874 | A | | 12/1926 | Marthen | |
| 1,693,808 | A | | 12/1928 | Catudel | |
| 1,829,335 | A | * | 10/1931 | Blue | 172/19 |
| 2,175,984 | A | | 10/1939 | Welsh | |
| 2,539,864 | A | * | 1/1951 | Rutherford | 172/305 |
| 2,601,380 | A | * | 6/1952 | Flory | 172/347 |
| 2,614,477 | A | * | 10/1952 | Habenicht | 172/20 |
| 2,646,740 | A | * | 7/1953 | Luoma | 172/19 |
| 2,650,532 | A | * | 9/1953 | Moldowan | 172/19 |
| 2,660,104 | A | * | 11/1953 | Rutherford | 172/305 |
| 2,721,438 | A | * | 10/1955 | O'Maley | 56/295 |
| 2,771,730 | A | * | 11/1956 | True | 56/11.6 |
| 2,897,901 | A | * | 8/1959 | Grube et al. | 172/20 |
| 3,034,586 | A | * | 5/1962 | Ditter | 172/19 |
| 3,197,951 | A | * | 8/1965 | Zick | 56/255 |
| 3,201,944 | A | * | 8/1965 | Christensen | 405/184 |
| 3,387,666 | A | * | 6/1968 | Hadfield | 172/20 |
| 3,468,381 | A | * | 9/1969 | Olsen | 172/19 |
| 3,656,554 | A | * | 4/1972 | Buhner | 172/14 |
| 3,710,563 | A | * | 1/1973 | Poletto et al. | 56/16.9 |
| 3,738,431 | A | * | 6/1973 | Gennow | 172/20 |
| 3,935,904 | A | | 2/1976 | Beck | |
| 3,946,815 | A | * | 3/1976 | Ajdukovic | 172/17 |
| 3,951,212 | A | | 4/1976 | Hallman | |
| 4,018,287 | A | | 4/1977 | Brouwer | |
| 4,049,060 | A | | 9/1977 | Hoke | |
| 4,072,195 | A | * | 2/1978 | Carlson | 172/15 |
| 4,119,002 | A | | 10/1978 | Coldiron | |
| 4,142,691 | A | | 3/1979 | Watton | |

(Continued)

FOREIGN PATENT DOCUMENTS

EP           23142 A1 *   1/1981

(Continued)

*Primary Examiner*—Thomas B. Will
*Assistant Examiner*—Jamie L. McGowan
(74) *Attorney, Agent, or Firm*—Fish & Richardson P.C.

(57) ABSTRACT

A sod cutting device containing aspects of the present invention contains an angled blade having a vertical cutting edge and a horizontal cutting edge. The angled blade is secured to a body member that in turn is movably affixed to a vehicle. Such a device may be used for cutting and trimming of grass sod around trees, hedges, gardens and elsewhere where it is desired to obtain a well-defined grass lawn edge.

11 Claims, 9 Drawing Sheets

U.S. PATENT DOCUMENTS

| | | |
|---|---|---|
| 4,188,164 A | 2/1980 | Hansen |
| 4,210,211 A | 7/1980 | Chandler et al. |
| 4,272,949 A * | 6/1981 | Franks et al. ................. 56/255 |
| 4,294,316 A | 10/1981 | Hedley et al. |
| 4,310,053 A | 1/1982 | Pearce |
| 4,345,659 A | 8/1982 | Arnold |
| 4,360,980 A | 11/1982 | Jarvis |
| 4,553,606 A * | 11/1985 | Arnold ........................ 172/19 |
| 4,577,697 A | 3/1986 | Moak |
| 4,588,034 A | 5/1986 | Leonard et al. |
| 4,616,713 A | 10/1986 | Shattuck |
| 4,621,696 A | 11/1986 | Brouwer |
| 4,629,006 A * | 12/1986 | Mullet et al. ................. 172/15 |
| 4,632,192 A | 12/1986 | Hooks |
| 4,652,176 A | 3/1987 | Leonard |
| 4,653,590 A | 3/1987 | Leonard |
| 4,660,650 A | 4/1987 | Moak |
| 4,676,538 A | 6/1987 | Fiedler |
| 4,694,717 A | 9/1987 | Boots |
| 4,718,221 A * | 1/1988 | Wessel et al. ................ 56/16.9 |
| 4,871,027 A | 10/1989 | Lindstrom et al. |
| 4,934,464 A | 6/1990 | Shields |
| 4,947,938 A | 8/1990 | Fricke et al. |
| 4,982,800 A | 1/1991 | Shields |
| 4,986,026 A | 1/1991 | Decker |
| 5,009,270 A | 4/1991 | Vangsgard |
| 5,165,843 A | 11/1992 | Hendriks et al. |
| 5,170,848 A | 12/1992 | Walton |
| 5,177,898 A | 1/1993 | Decker |
| 5,232,055 A | 8/1993 | Van Vuuren |
| D343,776 S | 2/1994 | Johnson |
| 5,406,709 A | 4/1995 | Stambaugh et al. |
| 5,481,827 A | 1/1996 | Decker |
| 5,609,213 A | 3/1997 | Anderson |
| 5,690,178 A * | 11/1997 | Zehrung, Jr. et al. ......... 172/19 |
| 5,697,453 A * | 12/1997 | Van Den Bosch ............ 172/41 |
| 5,775,436 A | 7/1998 | Noyes, II et al. |
| 5,816,035 A * | 10/1998 | Schick ........................ 56/15.2 |
| 5,988,289 A | 11/1999 | Holland et al. |
| 6,048,282 A | 4/2000 | Prevost et al. |
| 6,056,064 A | 5/2000 | deVries |
| 6,135,211 A | 10/2000 | Schroeder |
| 6,223,830 B1 | 5/2001 | deVries |
| 6,227,989 B1 | 5/2001 | Reid |
| 6,273,196 B1 | 8/2001 | Van Vuuren |
| 6,296,063 B1 | 10/2001 | Tvetene et al. |
| 6,302,219 B1 * | 10/2001 | Filippini ...................... 172/15 |
| 6,786,030 B2 * | 9/2004 | Nafziger ..................... 56/12.7 |
| 6,966,168 B1 * | 11/2005 | Kerr, Sr. ..................... 56/12.7 |

FOREIGN PATENT DOCUMENTS

GB            2258378 A  *  2/1993

* cited by examiner

FIG. 6

SOD CUTTING DEVICE

TECHNICAL FIELD

This invention relates to turf implements, and more particularly to sod cutting devices.

BACKGROUND

Lawn mowing and maintenance is a time consuming task. Trimming and ornamental upkeep around trees, gardens, shrubs, walkways and wherever a lawn ends can take up an inordinate amount of time compared to the total time needed to maintain a lawn. Often, upkeep around these lawn edges is performed manually. Accordingly, there is a need to provide sod cutting or trimming devices that are easy to use and efficient. There is also a need to provide sod cutting devices that alleviate the need to manually maintain the edges of turf.

SUMMARY

The present invention is directed to a sod cutting apparatus having a blade for making a generally vertical cut in grass sod and a generally horizontal cut under grass sod. Cuts made by a sod cutting device can facilitate sod removal, resulting in a well-defined lawn edge around trees, gardens, shrubs and wherever lawns terminate. The sod cutting device can be attached to a garden tractor, such as to the mower deck of a garden tractor. A blade of the sod cutting device may extend from the side of the tractor. The blade may be manually or mechanically lowered or rotated down into the sod. The blade may be lowered as the garden tractor moves forward. Once lowered, that part of the blade making a generally horizontal cut may be beneath the top of the sod. The forward tractor movement causes the blade to separate a strip of grass sod that may be easily discarded.

In one aspect, a sod cutting device incorporating aspects of the invention includes an angled blade having a vertical cutting edge and a horizontal cutting edge. The angled blade may be attached to a body member that is movably affixed to a vehicle such as a lawn mower, riding lawn tractor, or walk-behind lawn mower. These vehicles may be battery-operated or propelled by an internal combustion engine. The various cutting edges may be arcuate. In addition, the blade may contain a trailing edge, and in some embodiments this trailing edge is arcuate. The sod cutter may include various parts that are constructed of a hardened material so that the blade or other parts do not easily bend during use.

Since there is a generally horizontal portion of the blade and a generally vertical portion of the blade, there can be an angle measured between the top side the horizontal cutting edge and the outer side the vertical cutting edge, which faces away from the vehicle. The angle can be less than 90°, more than 90°, equal to 90°, or any particular angle between 0° and 180°. The shape of the blade at or near the corner of the angle may be arcuate. Alternatively, the entire blade may be generally arcuate.

In some embodiments, the body member is rotatable. For instance it may be round and/or elongated like a pipe. Typically the body member is movably attached to the vehicle, e.g., rotatably affixed. Such an attachment may allow the body member to be rotated about an axis that is generally parallel to the ground and generally perpendicular to the line of travel of the vehicle to cause the angled blade to engage the ground.

In some embodiments, the sod cutting device includes a lever, which may be secured to the body member. The lever and/or blade may be manipulated manually or mechanically. In some embodiments, the angled blade is raised and lowered in a generally linear direction. In other embodiments, the angled blade is raised and lowered by rotating the lever.

The details of one or more embodiments of the invention are set forth in the accompanying drawings and the description below. Other features, objects, and advantages of the invention will be apparent from the description and drawings, and from the claims.

DESCRIPTION OF DRAWINGS

The following drawings show various embodiments incorporating aspects of the invention.

FIG. 4b is a detailed view of the parts of the lever of FIG. 4a.

Like reference symbols in the various drawings indicate like elements.

DETAILED DESCRIPTION

The present invention relates to a sod cutting device for cutting and trimming grass sod around trees, hedges, gardens and elsewhere where it is desired to obtain a well-defined grass lawn edge. An embodiment of a sod cutting device 10 incorporating aspects of the invention sized and mounted on a mower deck 12 of a lawn tractor 15 is shown in FIGS. 1a-c & FIG. 2. Briefly, sod cutting device 10 includes a housing 20 that is secured to the mower deck 12. Disposed within housing 20 is a body member 25 (see FIGS. 5a and 6) that is secured to both a lever 30 and a blade 40. In some embodiments, the body member may be part of the vehicle itself so long as the body member serves to secure blade 40 and allow blade 40 to be moved up and down to engage and/or disengage the sod to be cut. For example, blade 40 could be attached directly to the mower deck.

Figure 1A:
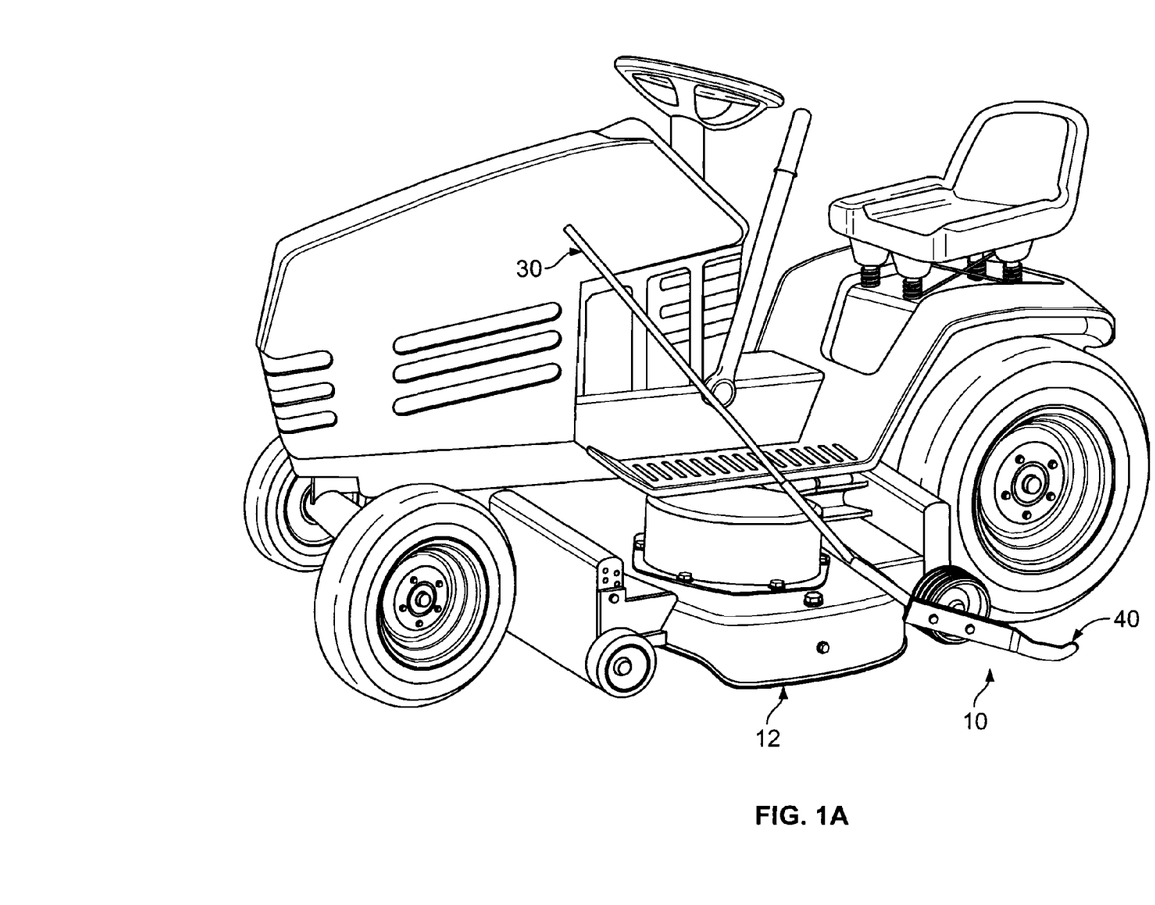
FIG. 1a is a perspective view of a sod cutting device incorporating aspects of the invention mounted on a garden tractor.
Figure 1B:
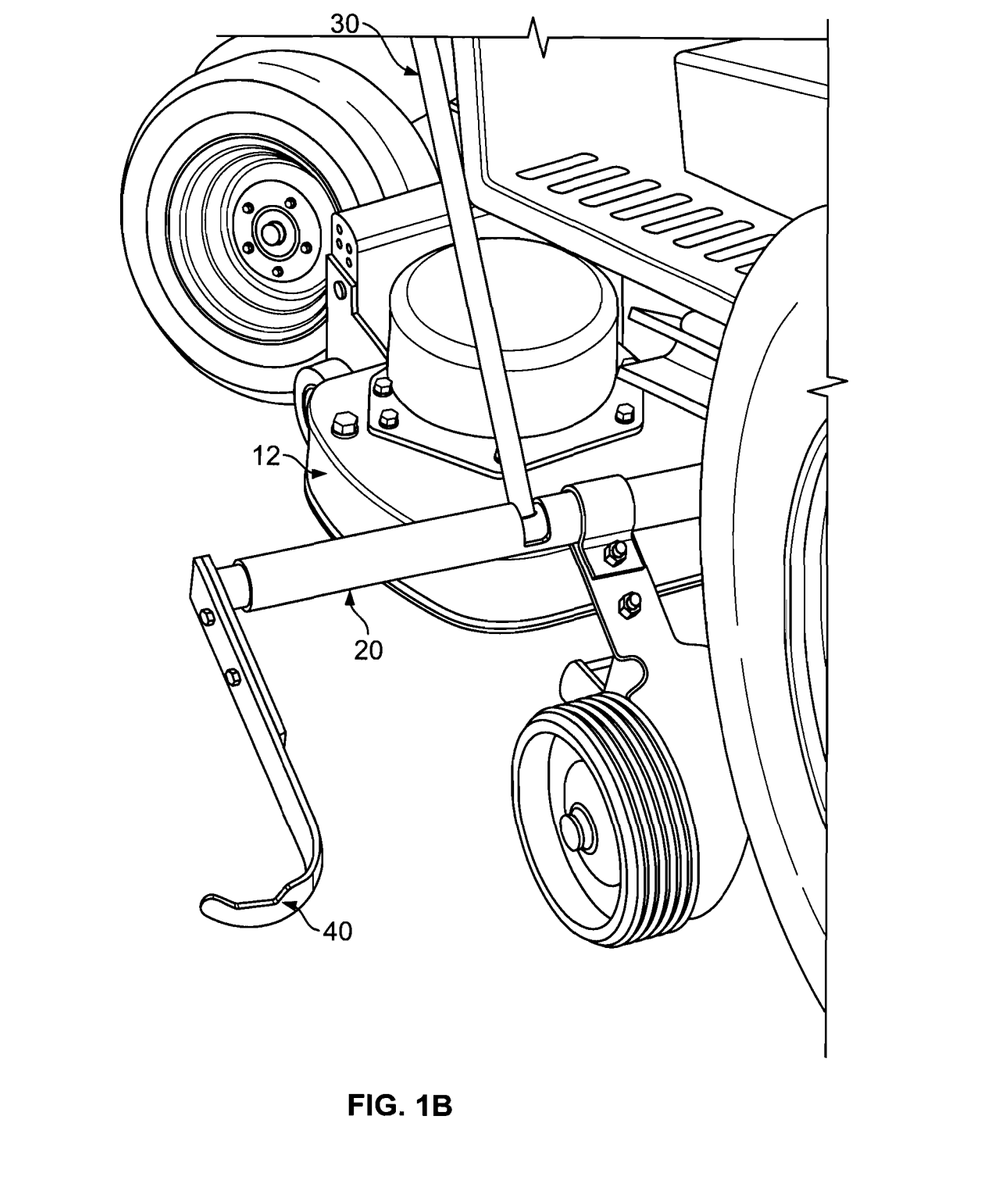
FIG. 1b is a close up perspective view of a sod cutting device incorporating aspects of the invention mounted on a garden tractor.
Figure 1C:
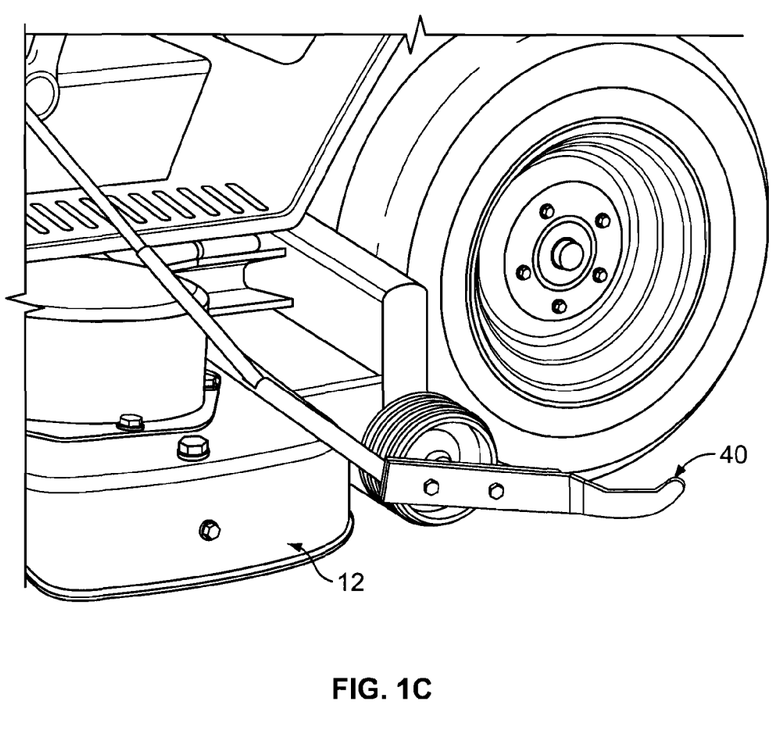
FIG. 1c is a close up perspective view of a sod cutting device incorporating aspects of the invention mounted on a garden tractor.

As viewed in FIGS. 1a-1c, rotating lever 30 towards the driver about an axis that is generally parallel to the ground and generally perpendicular to the line of travel of the lawn tractor may cause body member 25 to rotate, which in turn may cause blade 40 to rotate about the axis to a lower position and engage the ground and/or sod. Once lever 30 is rotated approximately beyond the vertical position depicted in FIG. 1, blade 40 may be partially below the sod pictured in FIGS. 1a-1c. Blade 40, which may be curved or arcuate in shape, will make a generally horizontal cut below the sod and a generally vertical cut through the sod as lawn tractor 15 is driven.

Figure 2:
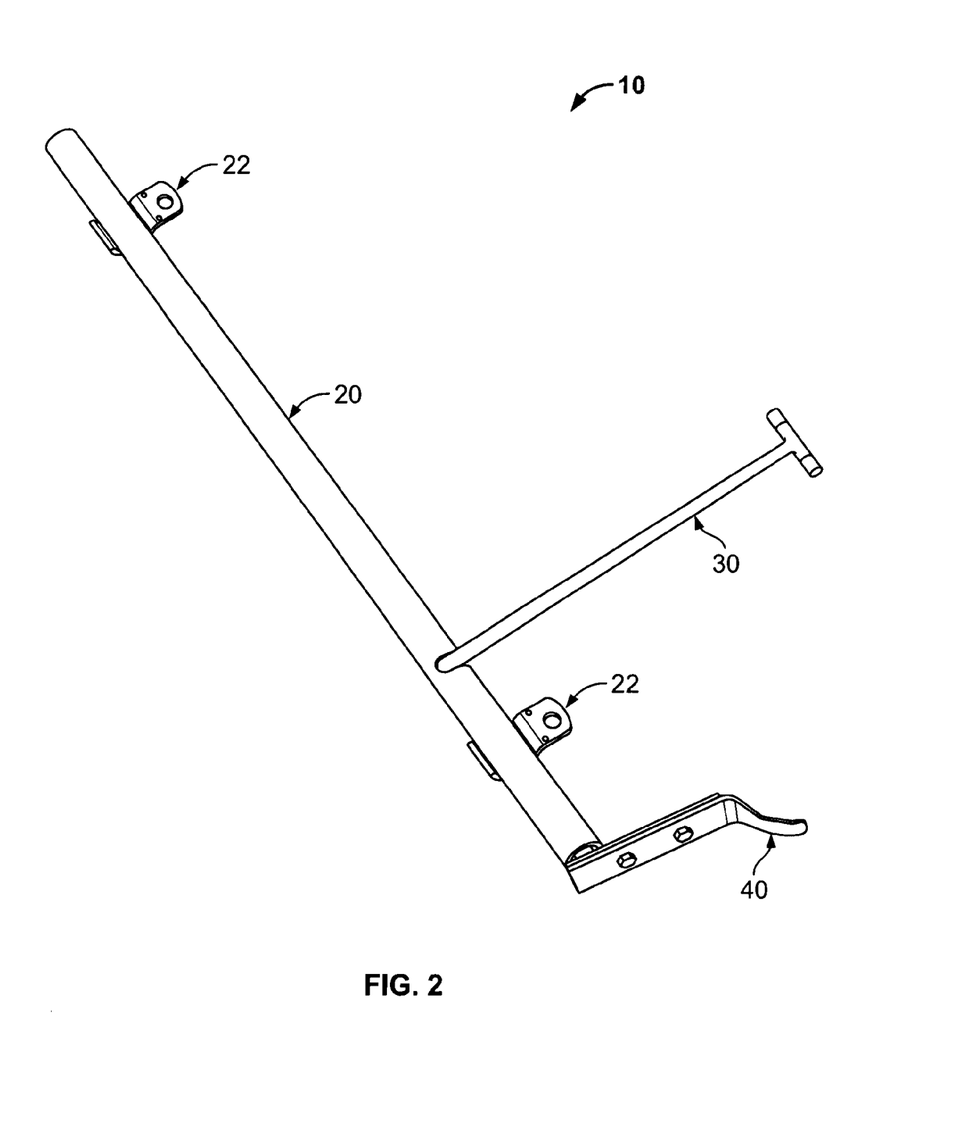
FIG. 2 is a perspective view of the sod cutting device of FIGS. 1a-1c depicting parts of the sod cutting device incorporating aspects of the invention.

In more detail, FIG. 2 shows an embodiment of the invention removed from lawn tractor 15. Sod cutting device 10 can be mounted to mower deck 12 (of FIGS. 1a-1c) using bolts through brackets 22. Sod cutting device 10 also can be mounted to the mower deck 12 or another area of the mower using any other acceptable method including welding, brazing, screws and/or designing the mower to accept body member 25 or housing 20.

Figure 3:
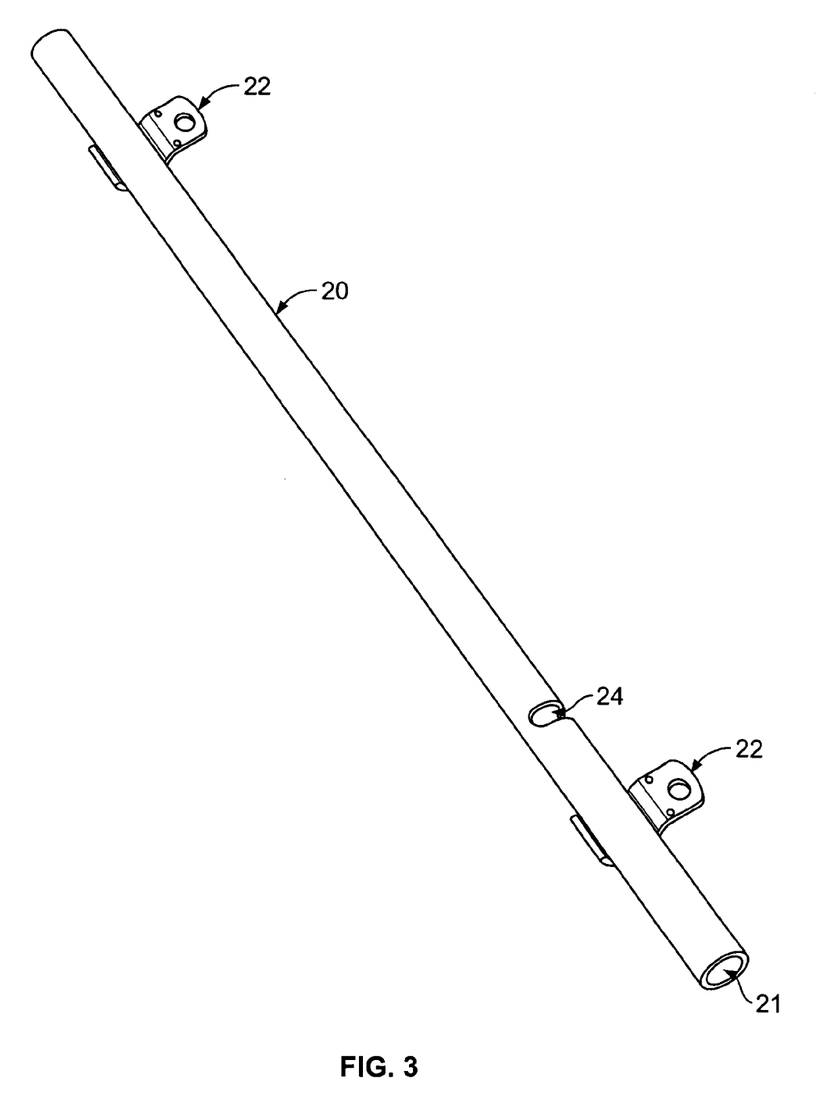
FIG. 3 is a perspective view of a housing for affixing a body member to a vehicle.

FIG. 3 shows housing 20 without the presence of body member 25, lever 30 or blade 40. Housing 20 includes an opening 21 designed to accept body member 25. Housing 20 may further include a notch or cut out 24 for receiving lever 30. Notch 24 should be large enough to accept lever 30 and allow it to rotate sufficiently to cause blade 40 to engage the sod. Notch 24 may provide a stop to limit the rotation of lever 30. The stop may control the depth of blade 40. Brackets 22 also are shown in FIG. 3. Brackets 22 can be temporarily or permanently attached to housing 20. Alternatively, brackets 22 may be designed to fit over or around housing 20 thereby securing it to mower deck 12.

Figure 4A:
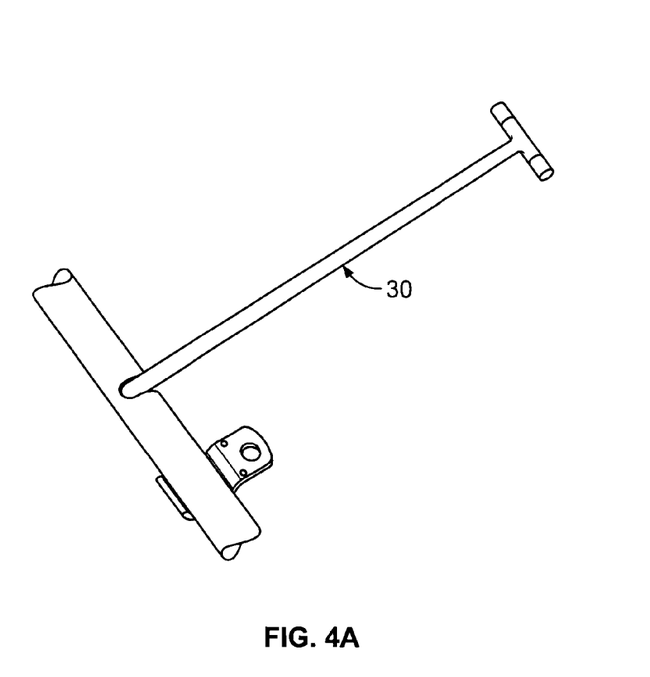
FIG. 4a is a perspective view of a lever for controlling the depth of the blade of a sod cutting device incorporating aspects of the invention.
Figure 4B:
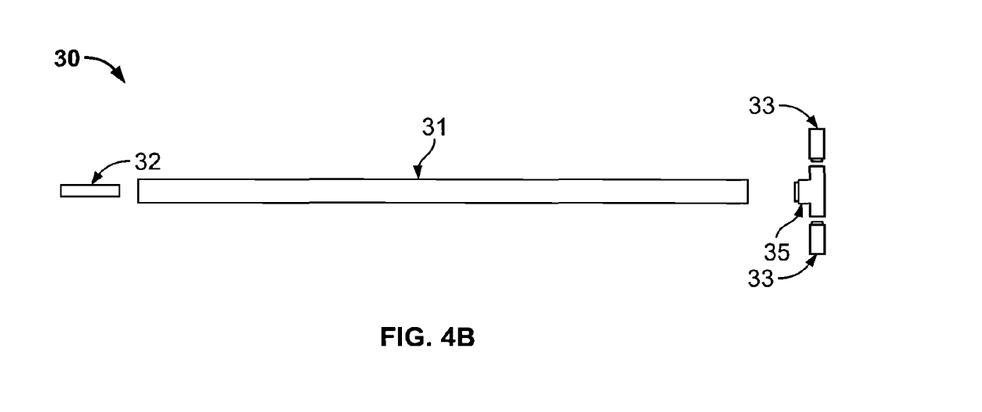

FIGS. 4a and 4b show a detailed view of a lever 30 that can be used as part of sod cutting device 10. Lever 30 may be made from a pipe 31. Lever 30 may further include pipe nipples 33 and a pipe tee 35 attached to one end of lever 30. A threaded hardened rod 32 may be screwed into the end of the pipe 31 portion of lever 30 leaving a threaded end exposed. This exposed end may be screwed into body member 25, which can contain a tapped hole 27 (see FIGS. 5a and 6) to receive rod 32. Rod 32 may be made of hardened material, and lever 30 may be attached by any other method that secures lever 30 to body member 25.

Lever 30 provides depth control for blade 40. Rotating lever 30 in the appropriate direction causes blade 40 to engage and cut the sod. Other factors may also control the blade depth. These other factors include the size of blade 40 and the mower height set for mower deck 12. Manual manipulation of lever 30 allows the operator to vary the depth when traveling over uneven sod. When roots, rocks or other obstructions are encountered, the movement of the tractor can pull blade 40 out of the ground by rotating it up. Lever 30 and the other movable aspects of sod cutter 10 may be designed to work mechanically by incorporating hydraulic cylinders, springs or other mechanical tension devices. Such alternative embodiments are within the skill of a person of ordinary skill in the art to which this invention pertains. For example, lever 30 can be designed to be engaged by an operator similar to how mower deck 12 is raised and lowered. Lever 30 could be redesigned to place blade 40 under spring-loaded tension to allow blade 40 to rotate up out of the ground when it encounters rocks or roots. It is envisioned that spring tension could also be used to cause blade 40 to reengage the sod after it encounters a rock or root. Alternatively, lever 30 may not be needed if blade 40 is designed to engage the sod by moving the blade in a generally straight up and down fashion not unlike how mower deck 12 can be moved up and down.

Figure 5A:
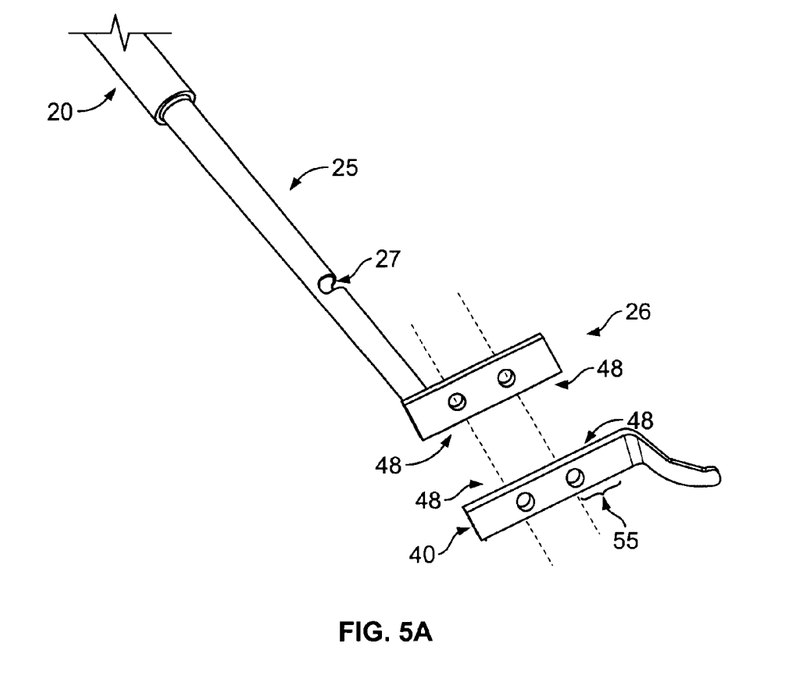
FIG. 5a shows a detailed view of illustrative mounting hardware for securing a blade to a body member.
Figure 5B:
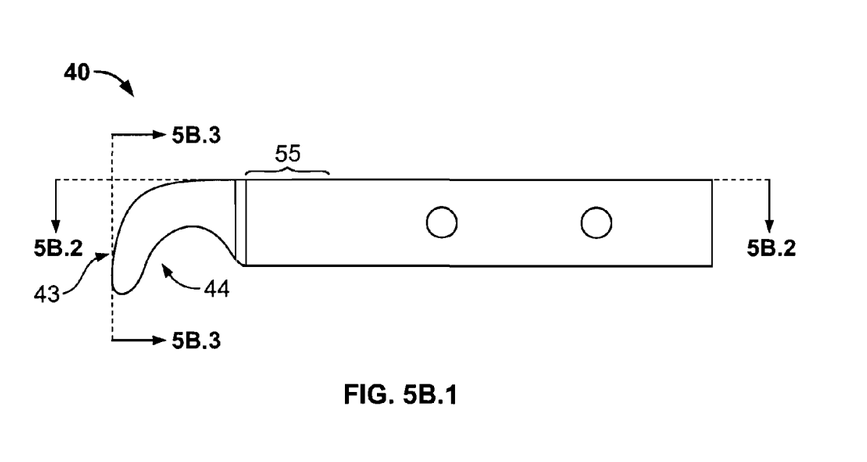
FIG. 5b shows various views of a sod cutting blade incorporating aspects of the invention. The views are designated 5b.1-5b.3.
Figure 5B:
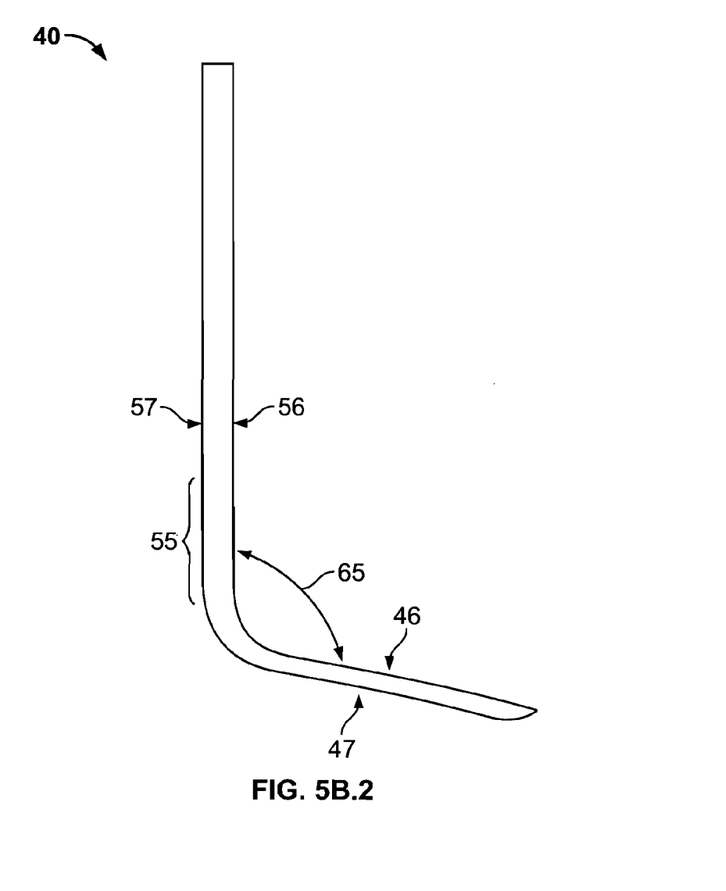
Figure 5B:
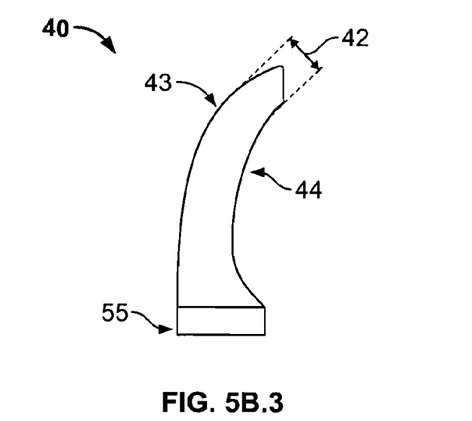

FIG. 5a shows body member 25 extending from housing 20, with a mounting flange 26 attached, e.g., welded, to one end. Blade 40 can be bolted through holes 48 or otherwise attached to mounting flange 26. As shown in FIG. 5a, there is a tapped hole 27 in body member 25. In operation of this embodiment, body member 25 is disposed within housing 20 so that hole 27 aligns with notch 24 and receives rod 32 thereby securing lever 30 to body member 25.

Sod cutter blade 40 is shown in FIG. 5b. In one embodiment, blade 40 is constructed of a hardened metal such as medium or high carbon hardened steel, or high tensile strength steel, to avoid bending when a rock, root or other obstruction is encountered. If the width 42, or horizontal cutting area, of blade 40 is too wide, it may tend to ride up out of the ground when cutting sod. A useful width 42 for embodiments of blade 40 adapted for lawn mowers ranges from about one-half inch to about four inches, about three-quarters of an inch to about three inches, and three-quarters of an inch to about one-and-one-half inches, and any particular value there between. In addition, width 42 may vary along the length of blade 40 depending on the arcuate taper imposed on blade 40. Blade 40 may be wider near the vertical cutting edge than it is at the distal tip of the horizontal cutting edge. Blade 40 may be designed with an arcuate taper to the horizontal cutting edge 43 so that there is a leading cutting edge that will slice through the ground beneath or through the grass roots. Trailing edge 44 may also include an arcuate taper. A blade 40 that is square to the line of travel, i.e., has no leading edge taper, can tend to bunch up the sod and not cut it. As depicted, the horizontal cutting edge 43 comprises a top side 46 and bottom side 47. Blade 40 also has a vertical sharpened cutting edge 55. The vertical cutting edge 55 comprises an outer side 56 facing away from the vehicle to which it is attached and an inner side 57 facing towards the vehicle. An angle 65 is formed between top side 46 and outer side 56. Angle 65 depicted in FIG. 5b is more than 90°. The angle may equal 90° or be greater than or less than less than 90° including any particular value greater than zero and less or equal to 180°. In addition, the horizontal cutting edge can be located before the vertical cutting edge and the vehicle.

Figure 6:
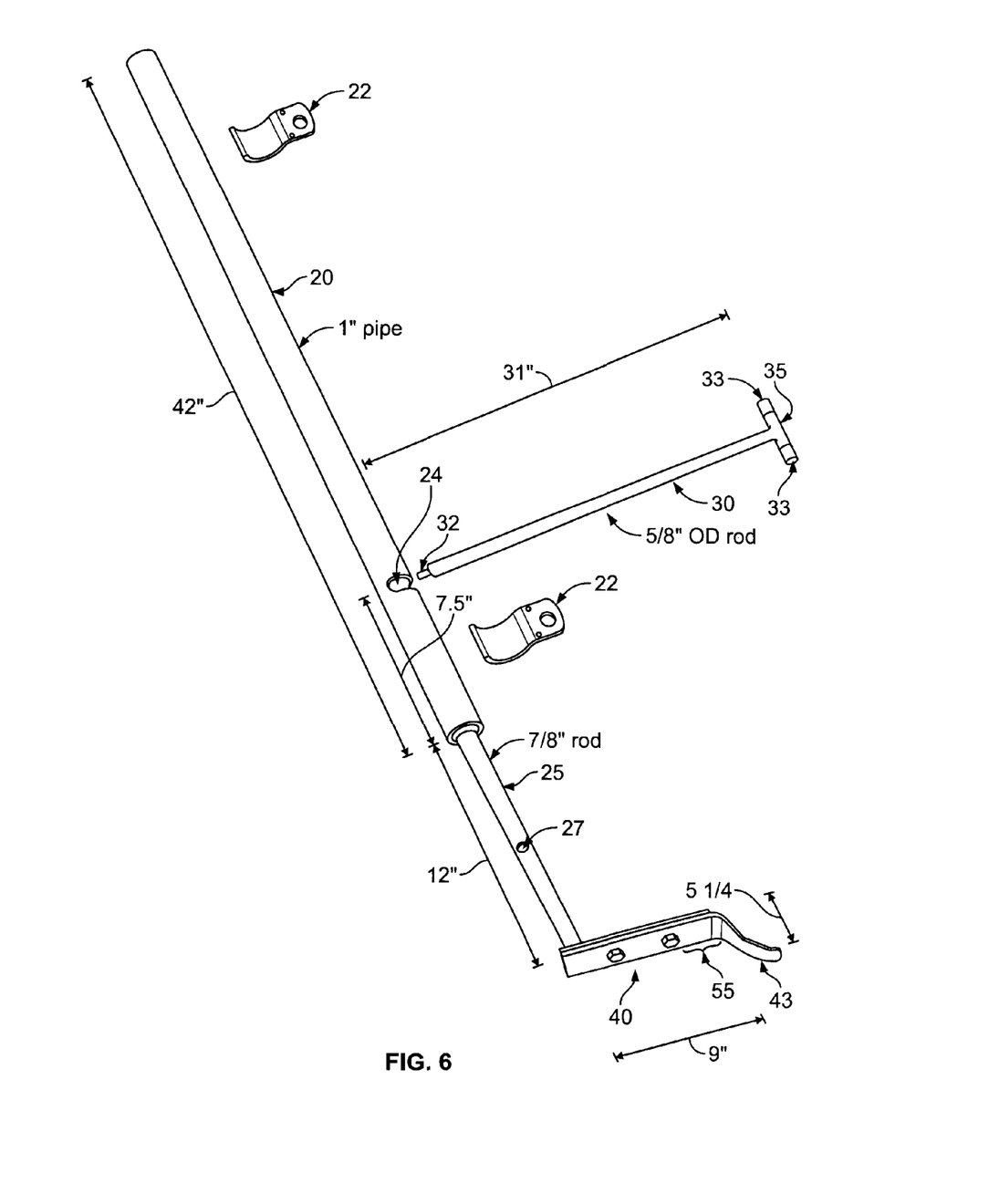
FIG. 6 shows the disassembled components and dimensions of an illustrative embodiment of a sod cutting device incorporating aspects of the invention sized for use with a lawn tractor.

FIG. 6 indicates the physical dimensions of the components of an embodiment of the invention designed for use on a 48 inch mower deck of a Toro™ Wheel Horse garden tractor. The sod cutting device included a housing 20 having an opening 21 constructed from a 1 inch pipe 42 inches in length. Notch 24 was a ⅝ inch deep by ¾ inch wide notch approximately 7.5 inches from one end of housing 20. Two pipe brackets 22 were used to secure housing 20 to garden tractor 15. A 31 inch lever 30 was made from a ⅜ inch pipe 31. Two 1.5 inch long ⅜ inch pipe nipples 33 and a ⅜ inch pipe tee 35 facilitated the easy assembly and disassembly of the control lever from the body member 25. A 5 inch×½ inch threaded hardened rod 32 was screwed into the end of pipe 31 portion of lever 30 leaving ⅞ inches exposed from the end of pipe 31. This ⅞ inch threaded portion of hardened rod 32 was screwed into body member 25, which contained tapped hole 27 to receive hardened rod 32. Hardened rod 32 was made from a hardened metal. Body member 25 included a mounting flange 26 (not pictured) welded to one end. Blade 40 was bolted to mounting flange 26 with two ½ inch hex bolts. Blade 40 was arcuate in shape and approximately 9 inches in length. The horizontal cutting edge 43 was approximately 5-6 inches in length. The vertical cutting edge 55 was approximately 3 inches long.

A number of embodiments of the invention have been described. Nevertheless, it will be understood that various modifications may be made without departing from the spirit and scope of the invention including resizing and/or configuring the sod cutting devises described herein to fit various vehicle types and sizes. For example, riding mowers of different sizes, walk behind lawn mowers, or other vehicles may accommodate the sod cutting devices described herein. These various vehicles may be powered by any means including solar, electric or internal combustion engines. In addition, although a particular arrangement of elements may be shown in one or more embodiments, those elements could be arranged in any number of appropriate arrangements, as would be recognized by a skilled artisan. Accordingly, other embodiments are within the scope of the following claims.

What is claimed is:

1. A system for cutting sod, comprising:
    a self-propelled vehicle having a lateral side and including
        a plurality of wheels to transport the vehicle along a longitudinal path; and
    a sod cutting assembly coupled to the vehicle, the sod cutting assembly comprising;
        a cutting blade, and
        a handle member to actuate the cutting blade between an operative position and an inoperative position,
        the cutting blade having a first blade portion extending in a direction away from and substantially perpendicular to the lateral side of the vehicle when in the operative position, wherein the first blade portion is arcuate in a substantially horizontal plane when in the operative position.

2. The system of claim 1, wherein the cutting blade includes a second blade portion perpendicular to the first blade portion such that the second blade portion is substantially vertical when the cutting blade is in an operative position.

3. The system of claim 1, further comprising a lawn cutting assembly coupled to and disposed beneath the vehicle.

4. The system of claim 3, wherein the sod cutting assembly is attached to the lawn cutting assembly.

5. The system of claim 4, further comprising a reciprocating mechanism to selectively raise and lower the lawn cutting assembly so as to alter the depth of the cutting blade in the soil.

6. The system of claim 1, wherein the handle is rigidly coupled to the cutting blade.

7. The system of claim 1, wherein the cutting blade is removably coupled to the sod cutting assembly.

8. The system of claim 1, further comprising a biasing mechanism to urge the cutting blade into at least one of the operative position or the inoperative position.

9. The system of claim 1, further comprising means to permit the cutting blade to move relative to the vehicle upon impact with a subterranean obstruction.

10. The system of claim 1, wherein said vehicle is a lawn tractor.

11. The system of claim 1, wherein the cutting blade is pivotally coupled to the vehicle.

* * * * *